April 28, 1936.  A. ERLACH  2,038,831
MANUFACTURE OF MULTICOLOR FILTER
Filed April 3, 1933
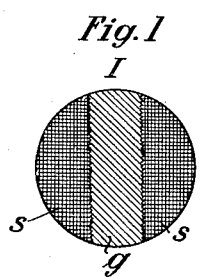
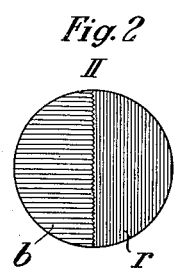
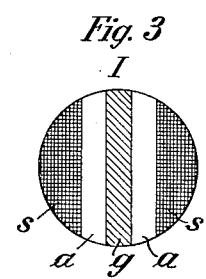
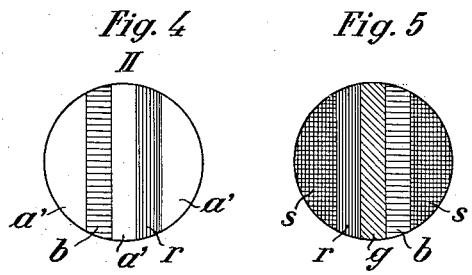
Inventor:
Alois Erlach,
By Attorney
Philip S. Hopkins.

Patented Apr. 28, 1936

2,038,831

UNITED STATES PATENT OFFICE 2,038,831

MANUFACTURE OF MULTICOLOR FILTER

Alois Erlach, Dessau in Anhalt, Germany, assignor to Agfa Ansco Corporation, Binghamton, N. Y., a corporation of New York Application April 3, 1933, Serial No. 664,270
In Germany April 7, 1932

7 Claims. (Cl. 95—81.5)

My present invention relates to the manufacture of multi-color light filters.

One of its objects is to provide an improved process of manufacturing multi-color light filters. Another object is the multi-color light filters produced by this improved process. Further objects will be seen from the detailed specification following hereafter. Reference is made to the accompanying drawing in which Figs. 1 to 5 show the different steps for the production of a three-color filter according to my process.

Multi-color light filters, more particularly those in which the different color areas are juxtaposed in the form of strips have hitherto been prepared by cutting the strips out of the filter sheets and pasting them side by side on one of the cover glasses by means of Canada balsam whereupon the second cover glass has been pasted by means of Canada balsam on the filter strips on the first cover glass. This process is associated with certain drawbacks. For instance, the cut filter strips can only with difficulty be pasted on the cover glass in such a manner that there is a sharp and straight demarcation line between adjacent strips, this being a reason why the adjoining edges of two adjacent color areas have been covered with a black line.

According to the present invention multi-color filters are made by producing on each cover glass a colored colloid layer by a casting operation and shaping the filter areas to fit exactly to one another, when the glasses are put together by cutting the dry filter layers on the cover glass. As, with this process the filter layers are permanently attached to a rigid support during the cutting operation they are not liable to distortion and can be joined accurately.

The colored filter layers are cast on the cover glasses in approximately the distribution required in the finished filter, the filter strips which are to be adjacent in the finished filter being produced on different cover glasses. By removing the superfluous portions of each filter strip the color areas are sharply defined so that, when superposing the cover glasses the color areas are strictly contiguous.

The accompanying drawing illustrates by way of example the manufacture of three color zones and two black segments.

Fig. 1 shows the cover glass I bearing a green central filter layer $g$ and two black segmental filter layers $s$.

Fig. 2 shows the cover glass II, one half of which is coated with a red filter layer $r$, while the other half is coated with a blue filter layer $b$.

The separation lines of adjacent filter coatings need not be exact, they need not be a straight line and the filter dyestuffs of one filter area may diffuse slightly into the adjacent filter areas, since the separation lines are removed during the subsequent treatment. The green filter strips on the cover glass I are now given the desired form, for instance, by cutting away superfluous parts by means of a knife or knive-like scraping devices. In the same manner the black segments are given their form so that they exactly join the glue and red strips in the finished three color filter. After this operation the cover glass I has the appearance represented in Fig. 3; between the filter areas $s$ and $g$ there are two strips $a$ of uncovered glass. The cover glass II is treated in the same manner and then assumes the appearance represented in Fig. 4; it has a red $r$ and a blue $b$ filter area and strips $a$ of uncovered glass into which there fit the filter areas of the cover glass I. Fig. 5 shows the finished three color filter obtained by uniting the cover glasses represented in Figs. 3 and 4.

What I claim is:

1. A process of manufacturing multi-color filters which comprises casting a colored colloid layer on a first cover glass, casting a solution of a colored colloid layer on a second cover glass, cutting away from each of said layers portions exactly corresponding geometrically to the remaining portions of the other, and uniting the elements so produced so that said layers interfit to form the multi-color filter.

2. A process of manufacturing multi-color filters which comprises casting several colored colloid layers on a first cover glass, casting several colloid layers in juxtaposition on a second cover glass, cutting away from each of said layers portions exactly corresponding geometrically to the remaining portions of the other, and unting the elements so produced so that said layers interfit to form the multi-color filter.

3. A process of manufacturing multi-color filters which comprises casting on a first cover glass a green colloid layer so as to occupy the central part and two black colloid layers occupying the marginal parts of said first cover glass, casting on a second cover glass a blue colloid layer so as to occupy one half and a red colloid layer to occupy the other half of said multi-color filter, cutting away from said colored layers portions exactly corresponding geometrically to the remaining portions of the other, and uniting the elements so produced so that said layers interfit to form the multi-color filter.

4. A multi-color filter comprising two cover glasses, strips of colored colloid layer arranged between said cover glasses, alternately attached to one and the other of said cover glasses and interfitting exactly.

5. A multi-color filter comprising two cover glasses, strips of colored colloid layer, part of said strips being attached to one of said cover glasses and part of said strips being attached to the other of said cover glasses, interstices between the strips of colored colloid layer on said cover glasses, said interstices being of such a width that the colored strips of the one cover glass exactly fit into the interstices of the other cover glass.

6. A multi-color filter comprising two cover glasses, strips of colored colloid layer, part of said strips being directly attached to one of said cover glasses and part of said strips being directly attached to the other of said cover glasses, interstices between the strips of colored colloid layer on said cover glasses, said interstices being of such a width that the colored strips of the one cover glass exactly fit into the interstices of the other cover glass.

7. A multi-color filter comprising two cover glasses, a green strip of colloid layer attached to the central part of one of said cover glasses, a red strip of colloid layer exactly contiguous to one side of said green strip and attached to the other cover glass, a blue strip of colloid layer exactly contiguous to the other side of said green filter strip and attached to said other cover glass, and two black segments exactly contiguous to said blue and said red filter strip respectively and attached to said first named cover glass.

ALOIS ERLACH.